United States Patent [19]

Sasaki et al.

[11] Patent Number: 4,786,552
[45] Date of Patent: Nov. 22, 1988

[54] CURABLE ARCYLIC/FUMARIC PRESSURE-SENSITIVE ADHESIVES

[75] Inventors: Yukihiko Sasaki, Claremont; Daniel Holguin, Fullerton; Robert Van Ham, Arcadia, all of Calif.

[73] Assignee: Avery International Corporation, Pasadena, Calif.

[21] Appl. No.: 883,491

[22] Filed: Jul. 7, 1986

[51] Int. Cl.⁴ .................................................. C09J 7/02
[52] U.S. Cl. ........................................ 428/355; 427/35; 427/54.1; 427/208.4; 428/343; 428/352; 428/354; 526/325; 526/329.5
[58] Field of Search ............... 428/355, 343, 352, 354; 526/329.5, 325; 427/208.4, 35, 54.1

[56] References Cited

U.S. PATENT DOCUMENTS

| | | | |
|---|---|---|---|
| 2,544,692 | 3/1951 | Kugler et al. | 428/355 |
| 2,642,414 | 6/1953 | Bauer et al. | 526/329.5 |
| 3,725,115 | 4/1973 | Christenson et al. | 427/208.4 X |
| 4,069,123 | 1/1978 | Skoultchi et al. | 526/329.5 X |
| 4,220,744 | 9/1980 | Tulacs et al. | 526/325 X |

Primary Examiner—Thomas J. Herbert
Attorney, Agent, or Firm—Christie, Parker & Hale

[57] ABSTRACT

There is provided a curable pressure-sensitive-adhesive layer comprising an interpolymerized hard-monomer system including one alkyl methacrylate present in an amount up to about 25% by weight, based on the total weight of the monomers, and a soft-monomer system present in an amount of from about 50% to about 95% by weight, and comprising at least one alkyl monoester or diester of an unsaturated dicarboxylic acid containing 4 carbon atoms wherein each alkyl group independently contains from 4 to about 8 carbon atoms, the monoester or diester being present in a total amount of up to about 30% by weight, based on the total weight of the monomers, and at least one alkyl acrylate. Cure occurs by electron-beam radiation or by ultraviolet radiation, the former at a dosage of up to 200 kiloGray, after application to a substrate. A multifunctional monomer may be used to enhance radiant-energy cure.

33 Claims, 2 Drawing Sheets

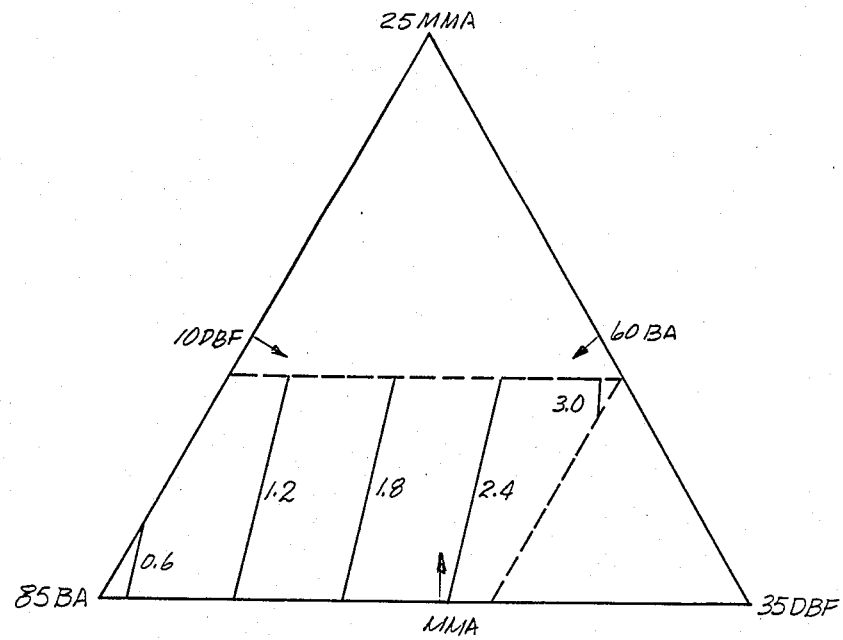

CURABLE ARCYLIC/FUMARIC PRESSURE-SENSITIVE ADHESIVES

BACKGROUND OF THE INVENTION

The present invention is directed to curable, preferably electron-beam (EB) curable, pressure-sensitive, acrylic-based fumaric interpolymers containing an interpolymerized amount of diesters of unsaturated dicarboxylic acids containing from 2 to 4 carbon atoms, namely, fumaric and maleic acids.

U.S. Pat. No. 2,544,692 to Kuegler et al discloses copolymerization of an acrylic acid with minor amounts of a fumarate diester. Lmulsion and bulk polymerization are stated as being feasible.

U.S. Pat. No. 4,220,744 to Tulacs et al discloses the use of two-stage bulk polymerization to form a viscous liquid containing interoolymerized amounts of dialkyl esters of fumaric or maleic acid.

U.S. Pat. No. 2,642,414 to Bauer et al discloses copolymers of esters of methacrylic acid and a saturated aliphatic monohydric alcohol and a maleinoid ester of a saturated aliphatic monohydric alcohol of from 4 to 14 carbon atoms, and certain organic acids. The maleinoid esters include dibutyl fumarate. The products of the reaction are disclosed to have utility in modifying the pour point of hydrocarbon oils.

The curing of monomers as well as polymers to induce or improve pressure-sensitive properties, is old in the art. Of relevance to the overall concept is U.S. Pat. No. 3,725,115 to Christenson et al, who disclose the preparation of pressure-sensitive adhesives by irradiating a hotmelt composition. The compositions disclosed are coated on release liners and are subjected to electron-beam irradiation of a dosage of from 6 to 8 megarad, leading to high peel strengths. The improved adhesive is then transferred to the face stock.

U.S. Pat. No. 4,069,123 to Skoultchi et al discloses the UV curing of homopolymers of alkyl esters of acrylic and methacrylic acids, and of copolymers of such esters with other comonomers, including $C_1$–$C_4$ alkyl half-esters of maleic and fumaric acids. The polymers are disclosed as being formed by bulk, solvent or emulsion polymerization.

It has not been heretofore known to use diesters of unsaturated dicarboxylic acids such as dibutyl fumarate, in combination with energy curing, to enhance adhesive properties. This is the subject matter of the instant invention.

SUMMARY OF THE INVENTION

The present invention is directed to novel, pressure-sensitive adhesive systems formed of cured acrylic-based pressure-sensitive adhesives that contain an interpolymerized amount of at least one alkyl monoester or diester of an unsaturated dicarboxylic acid containing 4 carbon atoms with from 4 to about 8 carbon atoms in each alkyl group. The monoester or diester promotes adhesion in the cured product. The diesters are presently preferred, with dibutyl fumarate being particularly preferred. The polymer contains at least one hard monomer and at least one additional soft monomer. Inclusion of a multifunctional-monomer crosslinking agent materially reduces the energy required to improve adhesive properties and is of significant value in low-energy improvement of elevated temperature shear. Cure may be chemical or by any convenient radiant-energy means, with ultraviolet (UV) or electron-beam (EB), particularly electron-beam, being preferred.

The copolymers provided as pressure-sensitive adhesives of the instant invention comprise from about 50% to about 95% by weight soft monomers, based on the total weight of the monomers, of which up to about 30% by weight, preferably from about 5% to about 30% by weight, based on the total weight of the monomers, is one or more alkyl monoester(s) or diester(s) of unsaturated dicarboxylic acids containing 4 carbon atoms in the unsaturated carboxylic-acid group and in which each alkyl group independently contains from 4 to about 8 carbon atoms. The balance of the soft monomer(s) is comprised of at least one alkyl acrylate containing from 2 to about 10 carbon atoms in the alkyl group. The balance of the monomer system is comprised of hard monomers, at least one of which is an alkyl methacrylate containing from about 1 to about 6 carbon atoms in the alkyl group present in an amount up to about 25% by weight, based on the total weight of the monomers. There may be included as a hard monomer, optionally but desirably, at least one unsaturated carboxylic acid containing from 2 to about 8 carbon atoms, present in an amount of from 0% to about 10% by weight, preferably from about 2% to about 10% by weight, based on the total weight of the monomers.

It is presently preferred that the pressure-sensitive adhesives of this invention contain, on an interpolymerized basis and based on the total weight of the monomers, from about 5% to about 30% by weight diester of the unsaturated dicarboxylic acid; from about 55% to about 90% by weight of an alkyl acrylate such as butyl acrylate and/or 2-ethylhexyl acrylate; up to about 25% by weight, more preferably from about 5% to about 20% by weight, of an alkyl methacrylate such as methyl methacrylate; and from about 2% to about 7% by weight of an unsaturated carboxylic acid, preferably acrylic acid.

The polymer systems may be formed in accordance with the instant invention, by bulk or solvent polymerization, and have a glass-transition temperature in the range of from about 30° to about 70° C. below the use-temperature, preferably from about 50° to about 70° C. below the use-temperature Bulk polymerization, to form polymers that are applied to a substrate, preferably by hot-melt techniques followed by cure, is the preferred mode of producing the pressure-sensitive adhesive products of the instant invention.

In the polymer, the interpolymerized diester of unsaturated dicarboxylic acid is an ingredient effective in promoting adhesion.

Curing, preferably EB or UV curing, is used to enhance adhesive properties, particularly shear. Thermal crosslinking may also be used. Dosage levels for EB cure, may be up to about 200 or more kiloGray (kGy), preferably up to 100 kGy. Inclusion of a multifunctional monomer containing at least 2 pendant functional groups, such as acrylates and methacrylates, materially improves shear, particularly high-temperature shear, with reduced radiation dosage levels being required to achieve enhanced pressure-sensitive adhesive properties.

BRIEF DESCRIPTION OF THE DRAWINGS

FIGS. 1 and 2 illustrate that, by increasing dibutyl-fumarate concentration, 180° peel is increased, while the purpose of FIG. 3 is to demonstrate that, by increasing the dibutyl-fumarate concentration, elevated temperature shear is increased. The diagrams are for the monomer systems dibutyl fumarate (DBF), butyl acrylate (BA), methyl methacrylate (MMA), and acrylic acid (AA).

FIG. 1, in particular, is for a constant methyl methacrylate concentration of 5% by weight, and is variable with respect to the other components.

FIG. 2 is for a constant acrylic acid concentration of 5% by weight, and is variable with respect to the other components.

FIG. 3, which is directed to high-temperature shear (70° C.), is for a constant acrylic acid concentration of 5% by weight, and is variable with respect to the other components.

Figure 1:
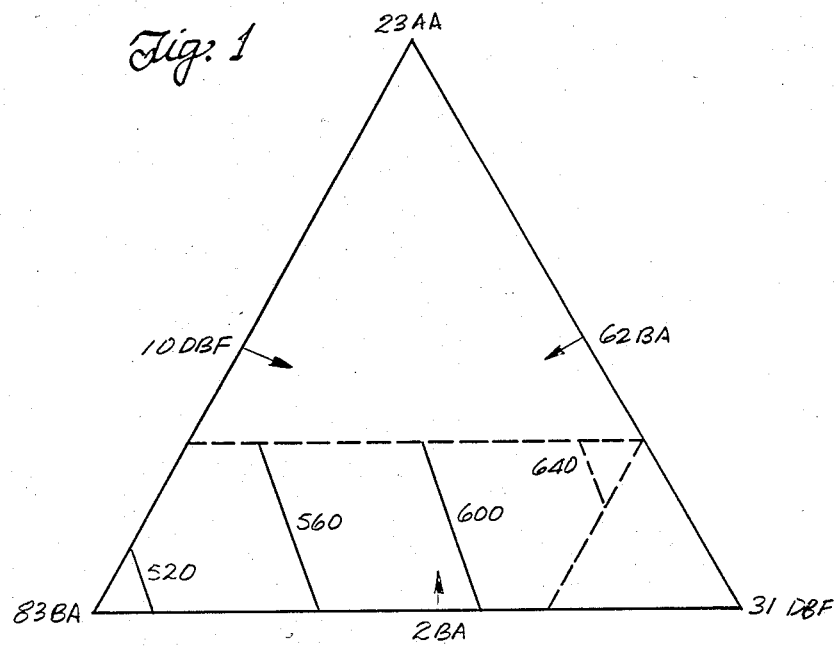
FIG. 1 is a ternary diagram showing the effect of dibutyl fumarate as an adhesion promoter.

Peel is measured in newtons-per-meter. Elevated temperature shear is measured in kiloseconds. All are for a dosage level of 30 kGy at a coating weight of 50 g/m².

DETAILED DESCRIPTION

It has now been found that pressure-sensitive adhesives based on alkyl monoesters and/or diesters of an unsaturated dicarboxylic acid, polymerized in combination with at least one hard monomer, such as an alkyl methacrylate, and at least one soft monomer, such as an alkyl acrylate, provide a pressure-sensitive adhesive in which the alkyl monoester or diester of the unsaturated dicarboxylic acid serves as an adhesion promoter. Curing, chemical but preferably radiation curing, more preferably electron-beam (EB) curing, improves shear, and the use of a multifunctional monomer materially reduces the radiant energy required to improve shear.

In particular, pressure-sensitive adhesives of the instant invention may be prepared by bulk or solvent polymerization, and comprise polymers containing up to about 30% by weight, based on the total weight of the monomer charge of at least one alkyl monoester or diester of an unsaturated dicarboxylic acid containing 4 carbon atoms in the unsaturated dicarboxylic acid and from 4 to about 8 carbon atoms in each alkyl group, with diesters being preferred, dibutyl fumarate being particularly preferred, and up to about 25% by weight, preferably from about 5 to about 20% by weight, of at least one hard monomer. It is presently preferred that the hard monomer content include a positive amount of an unsaturated carboxylic acid, preferably acrylic acid, present in an amount up to about 10% by weight, more preferably from 2% to about 10% by weight based on the total weight of the monomers. The bulk of the monomer system consists of soft monomers, preferably alkyl acrylates, most preferably butyl acrylate or 2-ethylhexyl acrylate, provided in a concentration of from about 55% to about 95% by weight.

In the system, cohesive strength is directionally proportional to the concentration of hard monomers and increases with an increase in the concentration of hard monomers.

Presently preferred pressure-sensitive adhesives, prepared in accordance with the instant invention, contain from about 15% to about 30% by weight of dibutyl fumarate, from about 55% to about 75% by weight of butyl acrylate, from about 15% to about 25% by weight of methyl methacrylate, and from about 2% to about 10% by weight acrylic acid, based on the total weight of interpolymerized monomers.

The formed adhesive polymers should have a weight-average molecular-weight ($\overline{M}w$) in excess of 100,000 for polymers having a narrow molecular weight distribution, and 140,000 for polymrs having a broad molecular weight distribution, to enable the desired response to EB curing, particularly in the presence of a multifunctional-monomer crosslinking aid. In general, constituents having a molecular weight of less than about 30,000 are nonresponsive to electron-beam radiation.

As used herein by the term "hard monomer" there is meant a monomer which, when homopolymerized, will yield a homopolymer having a glass-transition temperature greater than −25° C., preeerably greater than about 0° C. Among such monomers there may be mentioned methyl acrylate, alkyl methacrylates, such as methyl methacrylate, ethyl methacrylate, butyl methacrylate and the like; copolymerizable vinyl-unsaturated monomers, such as vinyl acetate, vinyl propionate and the like; and styrenic monomers, such as styrene, methylstyrene and the like; unsaturated carboxylic acids, such as acrylic acid, methacrylic acid, itaconic acid, fumaric acid and the like. By the term "soft monomer" there is meant a monomer which, when homopolymerized, will yield a polymer of a low glass-transition temperature, i.e., less than −25° C. Exemplary are the alkyl acrylates, such as butyl acrylate, propylacrylate, 2-ethylhexyl acrylate, isooctylacrylate, isodecylacrylate, and the like. Presently preferred is 2-ethylhexyl acrylate and/or butyl acrylate. The diester of an unsaturated dicarboxylic acid is included in the soft monomers.

The polymers prepared in accordance with the present invention, to be functional pressure-sensitive adhesives, must have a net effective glass-transition temperature of from about 30° to about 70° C. below the use temperature, preferably from about 50° to about 70° C. below the use temperature. Accordingly, the monomer used in the preparation of polymers of the instant invention are proportioned to provide polymerization products falling within the designated glass-transition temperature. It is for this reason that a soft monomer other than a diester, preferably 2-ethylhexyl acrylate, is provided as the bulk of the monomers employed. It is also desired that they have pendant acrylate or methacrylate groups to enhance UV and EB cure.

To produce a useful product, the pressure-sensitive adhesives prepared in accordance with the instant invention may be applied onto a substrate by solvent or hot-melt techniques. Hot-melt coatinc is preferred. Coating may be onto a facestock itself, or onto a substrate used to transfer the adhesive to the facestock or one to be combined with the facestock. When the pressure-sensitive adhesive is prepared hy solvent polymerization, the solvent is evaporated to yield the adhesive.

When used as a hot-melt, the adhesive must be of sufficiently low viscosity to enable flow at melt temperatures. Traditionally, the adhesive oroperty most greatly sacrificed in this instance, is shear. Curing of the cast hot-melt adhesives creatly improves shear properties. While thermal cure or crosslinking is feasible, radiation curing by EB or UV is preferred. Most preferred is EB cure. For EB cure, the level of energy introduced may be varied widely, but will generally range to about 200 kGy, preferably up to about 100 kGy, depending upon the nature of the adhesive and whether or not a multifunctional monomer is included.

Other forms of radiation, such as ultraviolet and gamma, may be used, but they have a narrower scope of utility than does EB curing. Thermal curing is also feasible. Such forms of radiation and thermal cure may require use of an initiator.

It is preferable to include the multifunctional monomer in the system as part of the monomer charge which undergoes polymerization, so that the multifunctional monomer can become chemically bound into the system, as opposed to hydrogen bonding in simple systems where admixture is employed, although an admixture is functional.

By "multifunctional monomer" as used herein, there is meant a monomer having 2 or more pendant functional groups, preferably acrylate or methacrylate groups. As representative multifunctional monomers there may be mentioned pentaerythritol triacrylate (PETA), triethyleneglycol diacrylate, triethyleneglycol dimethacrylate, trimethylolpropane trimethacrylate, trimethylolpropane triacrylate, tripropyleneglycol diacrylate, tripropyleneglycol dimethacrylate, 1,3-butyleneglycol dimethacrylate, tetraethyleneglycol dimethacrylate, and the like. Multifunctional monomers having ethoxylated and propoxylated backbones, may also be effectively used. When the multifunctional monomer is used, its concentration is in a positive amount up to about 8%, more preferably from about 1% to about 5% by weight, based on the total weight of the monomers. Its inclusion enables, at least in the instance of EB curing, a reduction in the dosage of EB energy required to improve shear, particularly elevated temperature shear.

Figure 2:
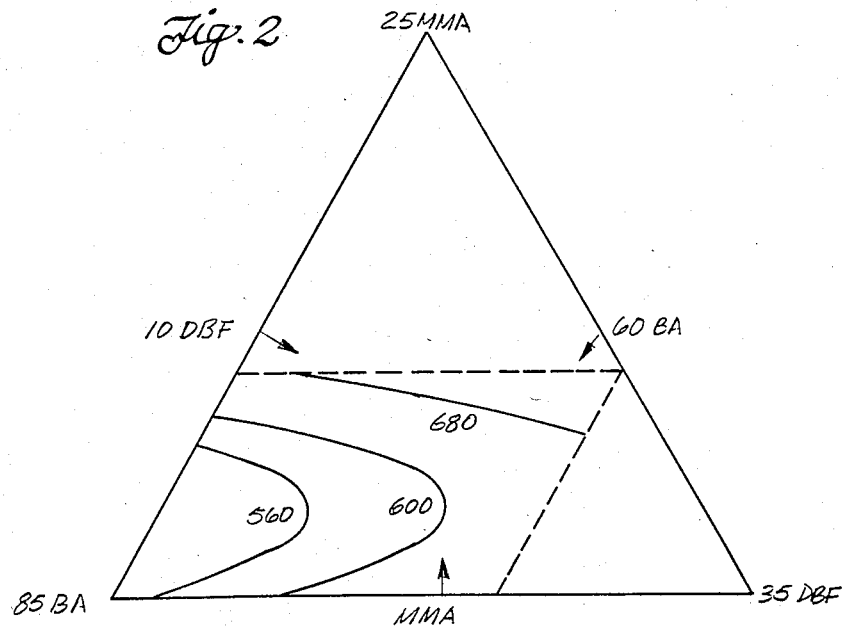

The influence of an alkyl diester of an unsaturated dicarboxylic acid on adhesion is illustrated in FIGS. 1 to 3. In each, the dosage level applied to an adhesive applied as a hot-melt at a coating weight of 50 g/m$^2$, was 30 kGy. The adhesive system was butyl acrylate, dibutyl fumarate, methyl methacrylate, and acrylic acid, and contained 2% PETA as a crosslinking agent. FIG. 1 shows the peel strength of the resultant adhesive as for constant methyl methacrylate concentration of 5% by weight, as the other ingredients are varied. As the dibutyl fumarate concentration increased, so did the 180° peel strength, for the regions defined by the dashed lines. FIG. 2 is for the same system, except that the constant is acrylic acid at a concentration of 5% by weight in the variable, with concentration of methyl methacrylate being a variable. FIG. 3 shows elevated temperature shear in kiloseconds, for the system where acrylic acid was a constant at 5% by weight, and shows the significant influence of the dibutyl fumarate as an adhesion promoter for the EB-cured hot-melt adhesive.

It will be appreciated that there may be included in the pressure-sensitive adhesives, tackifiers, fillers plasticizers and the like.

The following Examples illustrate the invention. With reference thereto, multifunctional monomer is given in percent by weight. Test methods utilized were as follows: molecular weight determinations were made using ASTM D-3536-76, ASTM D-3590-68 and ASTM E-682-79; shear by ASTM D-3654-78 and D-1000-68 and PSTC (Pressure-Sensitive Tape Council) Test #7, 6th Edition; 90° peel by PSTC Test #2, 5th Edition; and loop tack by PSTC Test #7, 6th Edition.

EXAMPLES 1 TO 3 AND CONTROLS A AND B

There were prepared by bulk polymerization, interpolymers containing 20% by weight dibutyl fumarate, 60% by weight butyl acrylate, 15% by weight methyl methacrylate, and 5% by weight acrylic acid. There is shown in Table I, as a function of molecular weight properties, the effect of a multifunctional crosslinking additive on elevated temperature shear. As can be seen, the multifunctional crosslinking additive produced a dramatic improvement in elevated temperature shear, in responsive polymers having a seight-average molecular-weight in consequence of the presence of the additive.

TABLE I

| | Molecular Weights | | Elevated Temperature Shear (ETS), 70° C., Kiloseconds (ks) | | |
|---|---|---|---|---|---|
| Ex/Con | Mw | Mw/Mn | 100 kGy, Uncompounded | 50 kGy w/2½% Saret[a] | 50 kGy w/2½% TEGDMA[b] |
| Ex 1 | 405,000 | 14.3 | 0.09 | 3.02 | 1.95 |
| Ex 2 | 206,000 | 10.1 | 0.3 | 3.78 | 1.99 |
| Ex 3 | 154,000 | 12.0 | 0.1 | n/a | 1.0 |
| Con A | 94,000 | 6.5 | 0.006 | 0.33 | n/a |
| Con B | 81,000 | 4.2 | 0.002 | 0.16 | .002 |

[a]Saret 500, a multifunctional, crosslinking-adhesive additive, manufactured and sold by the Sartomer division of Atlantic Richfield Co.
[b]Tetraethyleneglycol Dimethacrylate

EXAMPLES 4–11

For the same polymer system having a weight-average molecular-weight of 158,000, a ratio of weight-average molecular-weight to number-average molecular-weight of 6.5, and a viscosity at 150° C. of 23,000 cP, a sample was prepared by solvent-coating onto a release liner and laminated with 2 mil Mylar. There is shown in Table II, the effect of multi-functional monomers on physical properties of the EB-cured polymer at the dosage rates given.

TABLE II

| | | Properties | | | |
|---|---|---|---|---|---|
| Example | Multi-Functional Monomer | EB Dosage (kGy) | 500 g Shear (ks) | ETS 70° C. (ks) | 180° Peel (N/m) |
| 4 | — | 100 | 8.3 | .08 | 683 |
| 5 | 2½% Saret 500 | 50 | 86+ | 2.6 | 35 |
| 6 | 1% Saret 500 | 50 | n/a | 0.35 | n/a |
| 7 | 2½% Saret 515 | 50 | 86+ | 2.68 | 57 |
| 8 | 1% Saret 515 | 50 | n/a | 0.55 | n/a |
| 9 | 3% TEGDMA | 50 | 86+ | 3.21 | 57 |
| 10 | 2% TEGDMA | 50 | 86+ | 0.83 | 681 |
| 11 | 1% TEGDMA | 50 | 11.2 | 0.03 | 683 |

EXAMPLE 12

There is shown in Table III a polymer system having the composition of Examples 1 to 11, a weight-average molecular weight of 154,000, a number-average molecular weight of 12,800, and a viscosity at 150° C. of 24,000 cP. There is also shown the effect of dosage levels on elevated temperature shear (ETS) of 1,000 g shear and 180° peel, initial and after aging for 1 week at 70° C. For this polymer system, an increase in porperties was achieved at a dosage level of 15 kGy or above.

TABLE III

| Dosage (kGy) | ETS 70° C. (ks) | 1000 g Shear (ks) | 180° Peel (N/M) |
|---|---|---|---|
| Initial | | | |
| 5 | 0.10 | 1.8 | 840 |
| 10 | 1.00 | 18.0 | 753 |

TABLE III-continued

| Dosage (kGy) | ETS 70° C. (ks) | 1000 g Shear (ks) | 180° Peel (N/M) |
|---|---|---|---|
| 15 | 3.36 | 57.6 | 683(a) |
| 20 | 4.68 | 86.4+ | 683(a) |
| 25 | 3.06 | 86.4+ | 718(a) |
| Aging 1 Week, 70° C. | | | |
| | 0.18 | 2.2 | 788 |
| | 0.90 | 64.8 | 805 |
| | 2.22 | 18.0 | 735 |
| | 5.40 | 86.4+ | 735 |
| | 3.24 | 86.4+ | 718 |

(a) = Based on two samples, another sample had a 180° peel of 175 N/m, and exhibited slipstick (ss).

EXAMPLES 13 TO 20

Table IV sets forth the molecular-weight properties and adhesive properties for a number of polymers in which dibutyl fumarate is designated as DBF, butyl acrylate as BA, acrylic acid as AA, methyl methacrylate as MMA, and lauryl methacrylate as LMA. The adhesives were compounded with 2.5% by weight PETA and were EB-cured at a dosage level of 50 kGy.

TABLE IV

| Example | Composition | Monomer Concentration | Viscosity 150° C.(Pa · S) | $\overline{Mw}$ | $\overline{Mw}/\overline{Mn}$ | ETS 70° C. (ks) | 180° Peel (N/m) | Loop Tack (N/m) |
|---|---|---|---|---|---|---|---|---|
| 13 | DBF—BA—MMA—AA | 20-60-15-5 | 24.0 | 154,000 | 12.0 | 4.0 | 648 | 368 |
| 14 | DBF—BA—AA | 20-75-5 | 26.5 | 438,000 | 15.4 | 1.1 | 490 | 368 |
| 15 | DBF—BA—AA | 20-75-5 | 9.5 | 216,000 | 8.7 | 0.60 | 490 | 490 |
| 16 | DBF—BA—AA | 20-75-5 | 18.0 | 265,000 | 18.8 | 0.72 | 455 | 385 |
| 17 | DBF—BA—MMA—AA | 10-70-15-5 | 22.5 | 177,000 | 9.4 | 3.0 | 602 | ss |
| 18 | DBF—BA—MMA—AA | 10-77.5-7.5-5 | 26.0 | 395,000 | 8.2 | 0.90 | 560 | 490 |
| 19 | DBF—BA—LMA—AA | 10-77.5-7.5-5 | 24.0 | 502,000 | 13.7 | 0.36 | 385 | 315 |
| 20 | DBF—BA—LMA—AA | 20-60-15-5 | 48.0 | | | 0.96 | 350 | 333 |

EXAMPLES 21 TO 23

A polymer containing 15% by weight dibutyl fumarate, 70.3% by weight 2-ethylhexyl acrylate, 9.7% by weight methyl methacrylate, and 5% by weight acrylic acid, was combined with 2.5% by weight PETA and 1% by weight Irgacure; coated to a coat-weight of 29 g/m² on a release liner; and UV-cured at a density of 200 watts/in., at the speeds shown in Table V, then laminated to Mylar. Adhesive properties after processing, and after aging at 70° C. for 3 weeks, are shown.

TABLE V

| Example | Web Speed (fpm) | ETS 70° C. (ks) | 180° Peel (N/m) | Loop Tack (N/m) | Williams Plasticity Index No. |
|---|---|---|---|---|---|
| INITIAL | | | | | |
| 21 | 20 | 0.89 | 440 | 192 to 585 | 262 |
| 22 | 40 | 0.74 | 584 | 72 to 596 | 259 |
| 23 | 80 | 0.21 | 702 | 84 to 760 | 227 |
| AFTER 3 WEEKS | | | | | |
| 21 | — | 2.40 | 449 | 8 to 176 | — |
| 22 | — | 1.50 | 496 | 12 to 252 | — |
| 23 | — | 1.0 | 574 | 20 to 320 | — |

EXAMPLES 24–26

The polymer employed in Examples 21–23 was combined with 1.5% by weight PETA, and coated onto Mylar to a coat-weight of 49 g/m². The coated film was EB-cured through Mylar at the dosage levels shown in Table VI, which also shows initial adhesive properties and properties after 3 weeks at 70° C.

TABLE VI

| Example | Dosage (kGy) | RT Shear 1000 g (ks) | 70° C. Shear (ks) | 180° Peel (N/m) | Loop Tack (N/m) | Williams Plasticity Index No. |
|---|---|---|---|---|---|---|
| Initial | | | | | | |
| 24 | 10 | 9.7 | 0.57 | 824 | 528 | 230 |
| 25 | 30 | 8.3 | 0.81 | 600 | 676 | 256 |
| 26 | 50 | 13.0 | 1.08 | 696 | 496 | 256 |
| After 3 Weeks | | | | | | |
| 24 | — | 18.4 | 0.40 | 710 | 380 | 279 |
| 25 | — | 13.0 | 0.56 | 548 | 316 | 319 |
| 26 | — | 12.2 | 0.93 | 530 | 400 | 312 |

EXAMPLES 27 TO 29

A polymer containing, on a polymerized basis, 19% by weight dibutyl fumarate, 60% butyl acrylate, 13% by weight methyl methacrylate, 4% by weight acrylic acid, 4% by weight maleic anhydride, and 1% by weight hydroxy ethylacrylate, a crosslinking agent, and 1.5% Irgacure-651 photointiator, was coated onto a release paper to a coat-weight of 34 g/m²; UV-cured at the film speeds shown in Table VII, at a radiation level of 200 watts/in., then laminated with Mylar.

TABLE VII

| Example | Film Speed (fpm) | ETS 70° C. (ks) | 180° Peel (N/m) | Loop Tack (N/m) |
|---|---|---|---|---|
| Initial | | | | |
| 27 | 20 | 3.4 | 930 | 24 to 288 |
| 28 | 40 | 1.16 | 964 | 0 to 92 |
| 29 | 80 | 0.52 | 973 | 18 to 184 |
| After 3 Weeks at 70° C. | | | | |
| 27 | 20 | 6.91 | 930 | 80 |
| 28 | 40 | 4.75 | 973 | 62 |
| 29 | 80 | 3.54 | 1013 | 44 |

EXAMPLE 30

The polymer of Example 12 was combined with 1% by weight of an ionic crosslinking agent, and the mixture was applied to a substrate by solvent-coating. Cure occurred with heating to dry off the solvent, and an initial 180° peel of 840 Newtons per meter was obtained.

EXAMPLES 31 TO 33

The following compares product properties as function of UV cure and EB cure for the polymer containing 25 parts by weight dibutyl fumarate, 65 parts by weight 2-ethylhexylacrylate, 15 parts by weight methylmethacrylate, 2 parts by weight acrylic acid, 3 parts by weight maleic anhydride and 1.5 parts by weight 2-hydroxy ethylacrylate. Viscosity at 150° C. was 27 Pa.S. The adhesive was hot-melt coated onto a release liner for application to 1.5 mil primed mylar facestock. Table VIII shows adhesive performance for UV and EB cure. For UV cure, there was added 1% by weight of the polymer of Irgacure 651 manufactured and sold by Ciby Geigy.

TABLE VIII

| Curing | Example 31 UV Cured - Open Face | | | Example 32 EB Cured - Open Face | | | Example 33 EB Cured - Thru Mylar | | |
|---|---|---|---|---|---|---|---|---|---|
|  | 20 fpm | 40 fpm | 60 fpm | 1 Mrad | 3 Mrad | 5 Mrad | 1 Mrad | 3 Mrad | 5 Mrad |
| Shear Resistance |  |  |  |  |  |  |  |  |  |
| RT, 1 kg, 1.6 cm$^2$(ks) | 6.0 | 9.7 | 9.0 | 3.6 | 14.8 | 12.6 | 22.0 | 19.0 | 7.56 |
| 70° C., 500 g, 1.6 cm$^2$(ks) | 23.9 | 1.41 | 0.4 | 0.2 | 1.4 | 1.2 | 0.8 | 3.0 | 8.6 |
| Peel Adhesion, 180° (N/m) | 480 | 552 | 640 | 1044 | 640 | 556 | 772 | 596 | 532 |
| Loop Tack (N/m) | 688 | 672 | 768 | 920 | 848 | 780 | 740 | 668 | 696 |
| WPI, 50 ° C. | 371 | 328 | 315 | 227 | 305 | 343 |  |  |  |
| Cont. Weight g/m$^2$ | 54 | 54 | 54 | 49 | 49 | 49 | 49 | 49 | 49 |

What is claimed is:

1. A pressure-sensitive adhesive which is a cured pressure sensitive adhesive-layer interpolymer formed on a substrate comprising a pressure-sensitive adhesive polymer having a weight average molecular weight of at least about 100,000 and formed of an interpolymerized amount of a hard-monomer system comprising at least one monomer selected from the group consisting of methacrylate, and alkyl methacrylate containing from 1 to about 6 carbon atoms in alkyl group, an unsaturated carboxylic acid and mixtures thereof, said hard-monomer system being present in an amount up to about 25% by weight, based on the total weight of the monomers; and a soft-monomer system being present in an amount of from about 50% to about 95% by weight, based on the total weight of the monomers, and comprising at least one ester compound selected from alkyl monoesters and diesters of an unsaturated dicarboxylic acid containing 4 carbon atoms wherein each alkyl group independently contains from 4 to about 8 carbon atoms, and in which the ester compound is present in a total amount of up to about 30% by weight, based on the total weight of the monomers, said soft-monomer system further comprising at least one alkyl acrylate.

2. A pressure-sensitive adhesive as claimed in claim 1 in which the adhesive layer is formed by application to a substrate as a hot-melt adhesive prior to cure.

3. A pressure-sensitive adhesive as claimed in claim 2 in which there is present a multifunctional monomer in an amount from about 1% up to about 8% by weight of the total monomers.

4. A pressure-sensitive adhesive as claimed in claim 3 in which the multifunctional monomer is selected from the group consisting of pentaerythritol triacrylate and tetraethyleneglycol dimethacrylate.

5. A pressure-sensitive adhesive as claimed in claim 1 in which there is present an unsaturated carboxylic acid containing from 2 to about 8 carbon atoms in a positive amount up to about 10% by weight, based on the total weight of the monomers.

6. A pressure-sensitive adhesive as claimed in claim 5 in which the unsaturated carboxylic acid is acrylic acid.

7. A pressure-sensitive adhesive as claimed in claim 1 in which there is present a multifunctional monomer in a positive amount from about 1% up to about 8% by weight of the total monomers.

8. A pressure-sensitive adhesive as claimed in claim 7 in which the multifunctional monomer is selected from the group consisting of pentaerythritol triacrylate and tetraethyleneglycol dimethacrylate.

9. A pressure-sensitive-adhesive construction comprising a face material having thereon a cured pressure sensitive adhesive comprising, based on the total weight of electron-beam-irradiated interpolymerized monomers, from about 50% to about 95% by weight soft monomers having a homopolymerization glass-transition temoerature of less than about −25° C., of which from about 5% to about 30% by weight, based on the total weight of the monomers, is at least one alkyl diester of unsaturated dicarboxylic acid containing 4 carbon atoms, wherein each alkyl group independently contains from 4 to about 8 carbon atoms, and in which the balance of soft monomers is an alkyl acrylate containing from 2 to about 10 carbon atoms, the balance of the monomer system required to form 100 parts-by-weight monomer being comprised of hard monomers having a homopolymerization glass-transition temperature of greater than about −25° C. and selected from methyl acrylate and an alkyl methacrylate containing from 1 to about 6 carbon atoms in the alkyl group and present in an amount up to 25% by weight, based on the total weight of the monomers, and including at least one unsaturated carboxylic acid containing from about 2 to about 8 carbon atoms and present in a positive amount of up to 10% by weight, based on the total weight of the monomers, and a multifunctional monomer present in a positive amount up to about 8% by weight, based on the weight of the monomers, said polymer having a weight-average molecular-weight of at least about 100,000.

10. A pressure-sensitive-adhesive construction as claimed in claim 9 in which the adhesive is applied as a hot-melt adhesive and is cured by electron-beam radiation or ultraviolet radiation.

11. A pressure-sensitive-adhesive construction as claimed in claim 9 in which the multifunctional monomer is selected from the group consisting of pentaerythritol triacrylate and tetraethyleneglycol dimethacrylate.

12. A pressure-sensitive-adhesive construction as claimed in claim 9 in which the unsaturated carboxylic-acid content of the polymer is from about 2% to about 10% by weight based on the total weight of the monomers, the carboxylic acid is acrylic acid, and the polymer has a weight-average molecular-weight of at least about 140,000.

13. A pressure-sensitive-adhesive construction as claimed in claim 12 in which there is present a multifunctional monomer in an amount of from about 1% to about 8% by weight based on the total weight of the monomers.

14. A curable pressure-sensitive adhesive comprising a pressure-sensitive adhesive polymer having a weight average molecular weight of at least about 100,000 and formed of an interpolymerized amount of a hard-monomer system comprising at least one monomer which will homopolymerize to form a polymer having a glass transition temperature greater than about −25° C., said hard-monomer system being present in an amount up to about 25% by weight, based on the total weight of the monomers; and a soft-monomer system being present in an amount of from about 50% to about 95% by weight, based on the total weight of the monomers, and comprising at least one ester compound selected from alkyl monesters and diesters of an unsaturated dicarboxylic acid containing 4 carbon atoms wherein each alkyl group independently contains from 4 to about 8 carbon atoms, and in which the diester of the unsaturated dicarboxylic acid is present in a total amount of up to about 30% by weight based on the total weight of the monomers, said soft-monomer system further comprising at least one additional soft-monomer which will homopolymerize to form a polymer having a glass transition temperature less than −25° C.

15. A pressure-sensitive adhesive as claimed in claim 14 in which there is present a multifunctional monomer in a positive amount up to about 8% by weight of the total monomers.

16. A pressure-sensitive adhesive as claimed in claim 14 in which there is present an unsaturated carboxylic acid containing from 2 to about 8 carbon atoms in a positive amount up to about 10% by weight, based on the total weight of the monomers.

17. A pressure-sensitive adhesive as claimed in claim 16 in which the unsaturated carboxylic acid is acrylic acid.

18. A pressure-sensitive adhesive which is an electron-beam-cured adhesive-layer interpolymer comprising an interpolymerized hard-monomer system comprising at least one alkyl methacrylate containing from 1 to about 6 carbon atoms in the alkyl group, said hard-monomer system being present in an amount up to about 25% by weight, based on the total weight of the monomers, and comprising at least one ester compound selected from alkyl monoesters and diesters of an unsaturated dicarboxylic acid containing 4 carbon atoms wherein each alkyl group independently contains from 4 to about 8 carbon atoms, and in which the ester compound is present in a total amount of up to about 30% by weight, based on the total weight of the monomers, said soft-monomer system further comprising at least one alkyl acrylate.

19. A pressure-sensitive adhesive as claimed in claim 18 in which the alkyl acrylate is selected from the group consisting of 2-ethylhexyl acrylate and butyl acrylate.

20. A pressure-sensitive adhesive as claimed in claim 18 in which there is present acrylic acid in a positive amount up to about 10% by weight based on the total weight of the monomers.

21. A pressure-sensitive adhesive as claimed in claim 18 in which the alkyl methacrylate is methyl methacrylate.

22. A pressure-sensitive adhesive as claimed in claim 18 in which there is present an unsaturated carboxylic acid containinc from 2 to about 8 carbon atoms in a positive amount up to about 10% by weight, based on the total weight of the monomers.

23. A pressure-sensitive adhesive as claimed in claim 22 in which the unsaturated carboxylic acid is acrylic acid.

24. A pressure-sensitive adhesive as claimed in claim 18 in which there is present during cure, a multifunctional monomer in an amount from aoout 1% up to about 8% by weight of the total monomers.

25. A pressure-sensitive adhesive as claimed in claim 24 in which the multifunctional monomer is selected from the group consisting of pentaerythritol triacrylate and tetraethyleneglycol dimethacrylate.

26. A pressure-sensitive adhesive as claimed in claim 18 in which the adhesive layer is formed by aoplication to a substrate as a hot-melt adhesive prior to electron-beam cure.

27. A pressure-sensitive adhesive as claimed in claim 26 in which the alkyl methacrylate is methyl methacrylate.

28. A pressure-sensitive adhesive which comprises an electron-beam-cured pressure-sensitive adhesive-layer interpolymer having a weight average molecular weight of at least about 100,000 comprising an interpolymerized hard-monomr system comprising at least one alkyl methacrylate containing from 1 to about 6 carbon atoms in the alkyl group, said hard-monomer system being present in an amount up to about 25% by weight, based on the total weight of the monomers, and comprising at least one ester compuund selected from alkyl monoesters and diesters of an unsaturated dicarboxylic acid containing 4 carbon atoms wherein each alkyl group independently contains from 4 to about 8 carbon atoms, and in which the ester compound is present in a total amount of up to about 30% by weight, based on the total weight of the monomers, said soft-monomer system further comprising at least one alkyl acrylate.

29. A pressure-sensitive adhesive as claimed in claim 28 in which the alkyl acrvlate is selected from the group consisting of 2-ethylhexyl acrylate and butyl acrylate.

30. An electron-beam-cured pressure-sensitive adhesive comprising a pressure-sensitive adhesive polymer having a weight average molecular weight of at least about 100,000 and containing, on an interpolymerized basis and based on the total weight of the monomers, from about 5% to about 30% by weight of dibutyl fumarate, from about 55% to about 95% by weight of an alkyl acrylate selected from the group consisting of butyl acrylate and 2-ethylhexyl acrylate, methyl methacrylate in a positive amount of up to about 20% by weight, and acrylic acid in an amount of up to about 10% by weight.

31. A pressure-sensitive-adhesive construction as claimed in claim 30 in which the unsaturated carboxylic-acid content of the polymer is from about 2% to about 10% by weight, based on the total weight of the monomers, and the carboxylic acid is acrylic acid.

32. A pressure-sensitive-adhesive construction as claimed in claim 31 in which there is present a multifunctional monomer in an amount of from about 1% to about 8% by weight hased on the total weight of the monomers.

33. A pressure-sensitive adhesive-construction as claimed in claim 32 in which the multifunctional monomer is selected from the group consisting of pentaerythritol triacrylate and tetraethyleneglycol dimethacrylate.

* * * * *

UNITED STATES PATENT AND TRADEMARK OFFICE
CERTIFICATE OF CORRECTION

PATENT NO. : 4,786,552

DATED : November 22, 1988

INVENTOR(S) : Yukihiko Sasaki; Daniel Holguin; Robert Van Ham

It is certified that error appears in the above-identified patent and that said Letters Patent is hereby corrected as shown below:

On the Title Page, and column 1, line 2, in the title, change "ARCYLIC/FUMARIC" to -- ACRYLIC/FUMARIC --.

Column 1, line 14, change "Lmulsion" to -- emulsion --.
Column 1, line 18, change "interoolymerized" to -- interpolymerized --.
Column 1, line 33, change "hotmelt" to -- hot-melt --.
Column 1, line 63, change "crosslinking" to -- cross-linking --.

Column 2, line 45, after "use-temperature" insert a period.

Column 4, line 6, change "polymrs" to -- polymers --.
Column 4, line 9, change "crosslinking" to -- cross-linking --.
Column 4, line 15, change "preeerably" to -- preferably --.
Column 4, line 51, change "coatinc" to -- coating --.
Column 4, line 55, change "hy" to -- by --.
Column 4, line 59, change "oroperty" to -- property --.
Column 4, line 61, change "creatly" to -- greatly --.
Column 4, line 62, change "crosslinking" to -- cross-linking --.

Column 5, line 39, change "crosslinking" to -- cross-linking --.

UNITED STATES PATENT AND TRADEMARK OFFICE
CERTIFICATE OF CORRECTION

PATENT NO. : 4,786,552

DATED : November 22, 1988

INVENTOR(S) : Yukihiko Sasaki; Daniel Holguin; Robert Van Ham

It is certified that error appears in the above-identified patent and that said Letters Patent is hereby corrected as shown below:

```
Column 6, line 4, change "crosslinking" to
          -- cross-linking --.
Column 6, line 6, change "crosslinking" to
          -- cross-linking --.
Column 6, line 7, after "shear" change the period to a --,--.
Column 6, line 8, change "seight" to -- weight --.
Column 6, line 15, in Table 1 underline the tile Weights.
Column 6, line 22, change "crosslinking" to
          -- cross-linking --.
Column 6, line 23, change "division" to -- Division --.
Column 6, line 33, change "multi-functional" to
          -- multifunctional --.
Column 6, line 59, change "porperties" to
          -- properties --.

Column 8, line 1, before "Table" insert -- in --.
Column 8, line 22, change "crosslinking" to
          -- cross-linking --
Column 8, line 23, change "photointiator" to
          -- photoinitiator --.
Column 8, line 57, change "crosslinking" to
          -- cross-linking --.
```

In the Claims:

```
Column 9, line 30, before "alkyl" insert -- the --.
Column 9, line 50, change "ahout" to -- about --.
```

UNITED STATES PATENT AND TRADEMARK OFFICE
CERTIFICATE OF CORRECTION

PATENT NO. : 4,786,552

DATED : November 22, 1988

INVENTOR(S) : Yukihiko Sasaki; Daniel Holguin; Robert Van Ham

It is certified that error appears in the above-identified patent and that said Letters Patent is hereby corrected as shown below:

Column 10, line 7, change "ahout" to -- about --.
Column 10, line 21, change "temoerature' to -- temperature --.
Column 10, line 28, change "ahout" to -- about --.

Column 11, line 10, change "monesters" to -- monoesters --.
Column 11, lines 34-50, delete the entire claim 18 and insert therefor
-- A pressure-sensitive adhesive which comprises an electron-beam-cured pressure-sensitive adhesive-layer interpolymer having a weight average molecular weight of at least about 100,000 comprising an interpolymerized hard-monomer system comprising at least one alkyl methacrylate containing from 1 to about 6 carbon atoms in the alkyl group, said hard-monomer system being present in an amount up to about 25% by weight, based on the total weight of the monomers, and comprising at least one ester compound selected from alkyl monoesters and diesters of an unsaturated dicarboxylic acid containing 4 carbon atoms wherein each alkyl group independently contains from 4 to about 8 carbon atoms, and in which the ester compound is present in a total amount of up to about 30% by weight, based on the total weight of the monomers, said soft-monomer system further comprising at least one alkyl acrylate. --

UNITED STATES PATENT AND TRADEMARK OFFICE
CERTIFICATE OF CORRECTION

PATENT NO. : 4,786,552

DATED : November 22, 1988

INVENTOR(S) : Yukihiko Sasaki; Daniel Holguin; Robert Van Ham

It is certified that error appears in the above-identified patent and that said Letters Patent is hereby corrected as shown below:

Column 11, line 64, change "containinc" to -- containing --.

Column 12, line 6, change "aoout" to -- about --.
Column 12, line 13, change "aoplication" to -- application --.
Column 12, lines 19-36, claim 28, delete the entire claim and insert therefor
-- A pressure-sensitive adhesive as claimed in claim 18 in which the ester compound is dibutyl fumarate. --

Column 12, line 38, change "acrvlate" to -- acrylate --.
Column 12, line 60, change "hased" to -- based --.

Signed and Sealed this

Tenth Day of November, 1992

Attest:

DOUGLAS B. COMER

Attesting Officer

Acting Commissioner of Patents and Trademarks